(12) United States Patent  
Suganuma

(10) Patent No.: US 6,460,135 B1  
(45) Date of Patent: Oct. 1, 2002

(54) DATA TYPE CONVERSION BASED ON COMPARISON OF TYPE INFORMATION OF REGISTERS AND EXECUTION RESULT

(75) Inventor: Shigeru Suganuma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/411,376

(22) Filed: Oct. 4, 1999

(30) Foreign Application Priority Data

Oct. 2, 1998 (JP) ............................................. 10-280625

(51) Int. Cl.$^7$ ............................................. G06F 9/302
(52) U.S. Cl. ....................... 712/221; 708/204; 708/513; 712/222
(58) Field of Search ................. 708/204, 513; 712/221, 222

(56) References Cited

U.S. PATENT DOCUMENTS

| | | | | |
|---|---|---|---|---|
| 6,105,129 A | * | 8/2000 | Meier et al. | 712/222 |
| 6,108,772 A | * | 8/2000 | Sharanpani | 712/221 |
| 6,170,001 B1 | * | 1/2001 | Hinds et al. | 708/495 |
| 6,195,746 B1 | * | 2/2001 | Nair | 712/217 |

FOREIGN PATENT DOCUMENTS

| | | |
|---|---|---|
| JP | 63-5432 | 1/1988 |
| JP | 1-307831 | 12/1989 |
| JP | 5-100854 | 4/1993 |
| JP | 5-324313 | 12/1993 |
| JP | 8-16391 | 1/1996 |

OTHER PUBLICATIONS

Japanese office Action dated Mar. 24, 2000 with partial translation.

* cited by examiner

Primary Examiner—Kenneth S. Kim  
(74) Attorney, Agent, or Firm—McGinn & Gibb, PLLC

(57) ABSTRACT

In a microprocessor, a type information comparator compares type information of an execution result of an instruction with type information of the type information register corresponding to the data register which is requested by said instruction, and generates an exceptional interrupt in the case of disagreement. An input output execution unit simultaneously receives the data of the data register and the type information of the type information register corresponding to said data register and performs an input and output for an external via an external bus. A calculation execution unit simultaneously receives the data of the data register and the type information of the type information register corresponding to the data register, and executes calculation. An instruction controller decodes an instruction word given from the input output execution unit ,sends the instruction to the input and output execution unit and the calculation execution unit and inputs an exceptional interrupt from the type information comparator, and starts a specialized exceptional process.

42 Claims, 10 Drawing Sheets

| | | | 8 bit | 16 bit | 32 bit | 64 bit | 128 bit |
|---|---|---|---|---|---|---|---|
| TYPE INFORMATION OF DATA | FLOATING DECIMAL POINT / FIXED DECIMAL POINT | VECTOR TYPE / SCALAR TYPE | | | | | |
| | | | | | | | |
| | | SIGN ABSENCE | | | | | |
| 8 bit | | | RIGHT | INTER-RUPT | INTER-RUPT | INTER-RUPT | INTER-RUPT |
| 16 bit | | | RIGHT | RIGHT | INTER-RUPT | INTER-RUPT | INTER-RUPT |
| 32 bit | | | RIGHT | RIGHT | RIGHT | INTER-RUPT | INTER-RUPT |
| 64 bit | | | RIGHT | RIGHT | RIGHT | RIGHT | INTER-RUPT |
| 128 bit | | | RIGHT | RIGHT | RIGHT | RIGHT | RIGHT |

TYPE INFORMATION OF EXECUTION RESULT / FLOATING DECIMAL POINT / FIXED DECIMAL POINT / VECTOR TYPE / SCALAR TYPE / SIGN ABSENCE

| TYPE INFORMATION OF DATA | | | | | | |
|---|---|---|---|---|---|---|
| FLOAT DECIMAL POINT / FIXED DECIMAL POINT | | | | | | |
| VECTOR TYPE / SCALAR TYPE | | | | | | |
| SIGN ABSENCE | | 8 bit | 16 bit | 32 bit | 64 bit | 128 bit |
| | 8 bit | RIGHT | INTERRUPT-CONVERSION | INTERRUPT | INTERRUPT | INTERRUPT |
| | 16 bit | RIGHT | RIGHT | INTERRUPT | INTERRUPT | INTERRUPT |
| | 32 bit | RIGHT | RIGHT | RIGHT | INTERRUPT | INTERRUPT |
| | 64 bit | RIGHT | RIGHT | RIGHT | RIGHT | INTERRUPT |
| | 128 bit | RIGHT | RIGHT | RIGHT | RIGHT | RIGHT |

DATA 16 bit
RESULT OF EXECUTION 8 bit
CONVERSION RIGHT

| TYPE INFORMATION OF DATA | | | | | | |
|---|---|---|---|---|---|---|
| FLOATING DECIMAL POINT / FIXED DECIMAL POINT | | | | | | |
| VECTOR TYPE / SCALAR TYPE | | | | | | |
| SIGN ABSENCE | | 8 bit | 16 bit | 32 bit | 64 bit | 128 bit |
| | 8 bit | RIGHT | INTERRUPT→ CONVERSION RIGHT | INTER-RUPT | INTER-RUPT | INTER-RUPT |
| | 16 bit | RIGHT | RIGHT | INTER-RUPT | INTER-RUPT | INTER-RUPT |
| | 32 bit | RIGHT | RIGHT | RIGHT | INTER-RUPT | INTER-RUPT |
| | 64 bit | CONVERSION RIGHT→ INTERRUPT | CONVERSION CONVERSION RIGHT→ INTERRUPT | CONVERSION CONVERSION RIGHT→ INTERRUPT | CONVERSION RIGHT→ INTERRUPT | INTERRUPT→ INTERRUPT |
| | 128 bit | RIGHT | RIGHT | RIGHT | RIGHT | RIGHT |

RESULT OF EXECUTION 64 bit ALL INTERRUPTS

TYPE INFORMATION OF EXECUTION RESULT
FLOATING DECIMAL POINT / FIXED DECIMAL POINT
VECTOR TYPE / SCALAR TYPE
SIGN ABSENCE

FIG. 9

DATA TYPE CONVERSION BASED ON COMPARISON OF TYPE INFORMATION OF REGISTERS AND EXECUTION RESULT

BACKGROUND OF THE INVENTION

This invention relates to a microprocessor and a LSI (Large Scale Integrated circuit) in which the microprocessor is integrated as a core, and in particular, to a microprocessor which contains a general-purpose register (hereinafter, referred to as a register) and a LSI in which the microprocessor is integrated as a core.

All of registers provided inside a microprocessor generally have fixed bit widths. In this case, when there is not in agreement with an effective bit width of a real data, for example, when the effective bit width of the real data is smaller than the bit width of the register, an upper bit of the register is invalid.

The effective bit width of the data retained in the register is set by an instruction which conducts data-load for the register. To this end, compiler for use in the microprocessor must assure matching between the bit width of the register of the microprocessor and the effective bit width of the real data.

Meanwhile, the bit width of the register of the microprocessor trends to extend every when generation of the processor is updated. The bit width has been extended at every double as 8 bits, 16 bits, 32 bits, 64 bits, and 128 bits.

On the other hand, the microprocessor assures host compatibility at a binary level in many cases in order to utilize past software source. In principle, design is performed such that past program itself can be executed (for example, refer to Japanese Unexamined Patent Publication (JP-A) No. S63-5432).

However, when the bit width of the register is extended in the above-mentioned conventional microprocessor, no consideration is taken about a bit of the extended portion in the past program. Therefore, there is possibility that inconvenience with respect to software occurs. In particular, this trend readily occurs when an instruction is optimized for the microprocessor of a specific generation.

Further, a data type of a data retained in the register includes a fixed decimal point type, a floating decimal point type, a vector type except an integral number type specified by the effective bit width, and control and conversion of these data types are complex under control of the compiler.

SUMMARY OF THE INVENTION

It is therefore an object of this invention to provide a microprocessor which is capable of assuring an operation of a program even when a bit width of a register is varied by bit width extension due to generation change of the microprocessor.

It is another object of this invention to provide a microprocessor which is capable of previously preventing generation of bug due to an error of a data type which becomes a problem at an initial stage of program development.

It is further another object of this invention to provide a LSI which contains the above-mentioned microprocessor as a core.

In a microprocessor according to this invention, a type information register is attached to an internal data register, and a type information (a data type and an effective bit width) of a data retained in a data resister is indicated.

The type information register is updated with reference to the type information of the data at a time of execution of a load instruction from a memory into the register or storage of a calculation result. When a variety of instructions are executed for the register and when the data is read out from the register, the type information is also read out with the data, and is sent to an internal bus with a variety of control information.

A calculation execution unit detects the type information, and designates the type information contained in the instruction, or compares with the type information of the other data. When disagreement occurs for the type information of each data, the type of the data is automatically converted, or matching is realized by software by generating an exception interruption.

Thereby, the instruction itself can conduct a process without considering the type information of the data sent from the register.

BRIEF DESCRIPTION OF THE DRAWING

FIG. 6 is a diagram exemplifying content of a type conversion table in FIG. 4 and FIG. 5;

FIG. 8 is a diagram exemplifying a case that matrix elements of the type conversion table illustrated in FIG. 6 are updated by a specific instruction;

FIG. 9 is a diagram exemplifying a case that matrix elements of the type conversion table illustrated in FIG. 6 are simultaneously updated by a specific instruction;

DESCRIPTION OF THE PREFERRED EMBODIMENTS

Hereinafter, description will be made about this invention with reference to drawings.

First Embodiment

Figure 1:
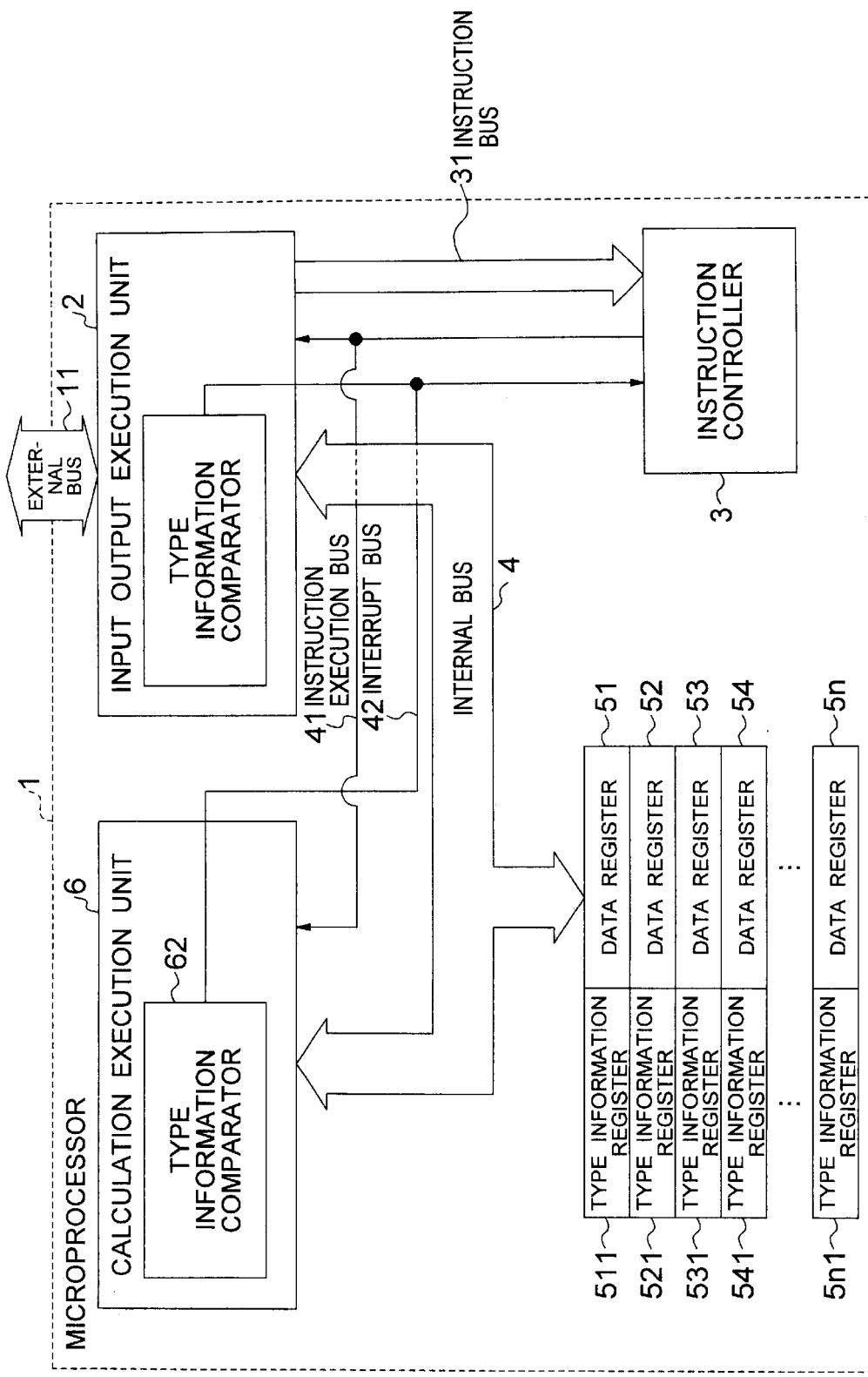
FIG. 1 is a circuit block diagram showing a structure of a microprocessor according to a first embodiment of this invention.

Referring to FIG. 1, description will be made about a first embodiment according to this invention.

A microprocessor according to this embodiment comprises an input and output execution unit 2 containing a type information comparator 22, an instruction controller 3, an internal bus 4, a calculation execution unit 6 containing a type information comparator 62, an external bus 11 which connects the input and output execution unit 2 to an external, an instruction execution bus 41 which connects between the instruction controller 3, the input output execution unit 2 and the calculation execution unit 6, an interrupt bus 44 which connects between the type information comparators 22 and 62 and the instruction controller 3, a plurality of data registers 51~5n (n is an arbitrary positive integration number), type information register 511~5n1 corresponding to each of the data registers.

The input and output execution unit 2 performs an input of an instruction word from the external and an input and output for the external by the use of the external bus 11.

The instruction controller 3 decodes the instruction word inputted via the instruction bus 31, and sends the instruction (operation code) into the input and output execution unit 2 or the calculation execution unit 6 via the instruction execution bus 41.

Further, the instruction controller 3 receives an exception interrupt via the interrupt bus 42, and starts a specialized exception process due to software.

The calculation execution unit 6 performs calculation in accordance with the instruction inputted via the instruction execution bus 41. The data register 51~5n is a register of a fixed bit width.

The type information register 511~5n1 retains the type information indicating the data type and the effective bit width of the data which is retained in the data register for each of the data registers 51~5n.

The internal bus 4 is a bus which is capable of simultaneously transmitting the data of the data register 51~5n and the type information of the type information register 511~5n1. The internal bus 4 connects between the data register 51~5n and the type information register 511~5n1 and the input and output execution unit 2 and the calculation execution unit 6.

Figure 3:
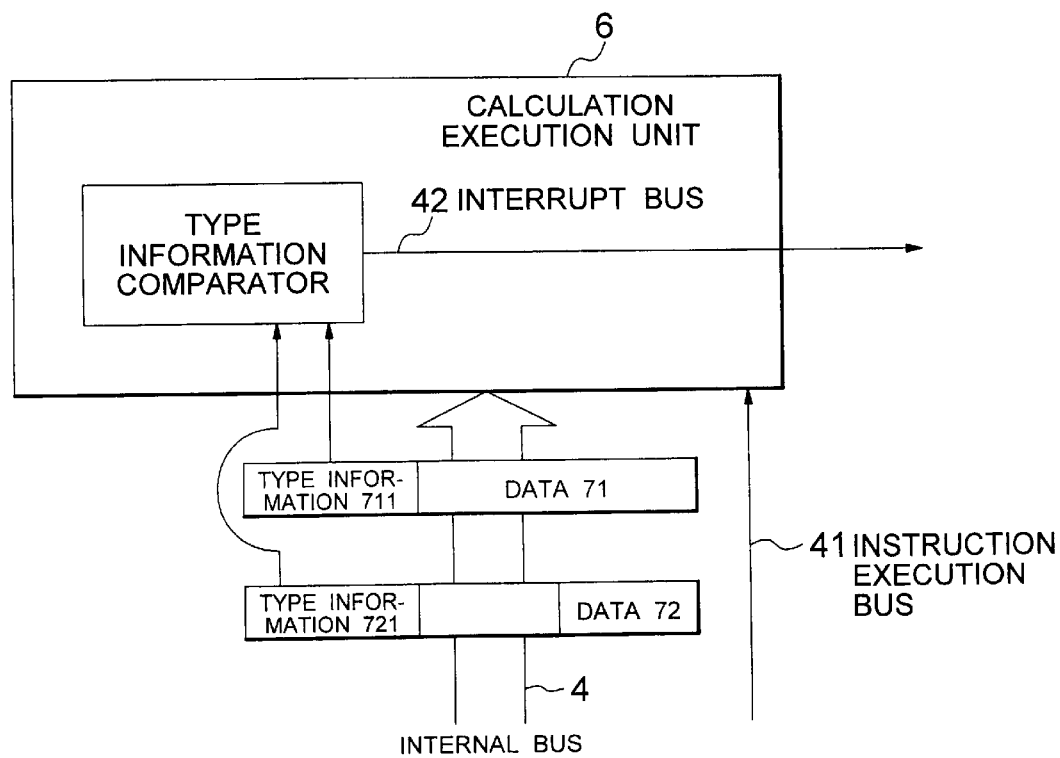
FIG. 3 is a diagram explaining generation of an exception interruption when type information disagrees in a microprocessor according to the first embodiment.

FIG. 3 is a diagram exemplifying a comparating process of the type information (the data type and the effective bit width) in the microprocessor 1 according to the first embodiment. In this example, the data 72 has an effective bit width of half of the data 71. This fact is reflected for type information 711 and 721.

Subsequently, description will be made about an operation of the thus-structured microprocessor 1 according to the first embodiment with reference to FIG. 1 through FIG. 3.

The input and output execution unit 2 gives the instruction word inputted from the external bus 11 into the instruction controller 3 via the instruction bus 31.

The instruction controller 3 decodes the inputted instruction word, and if the operation code indicates the calculation instruction, read-out instruction is carried out for the corresponding data register among the data registers 51~5n on the basis of the field of the register 1 in the instruction word.

The data register, which is instructed read-out, and the type information register corresponding thereto simultaneously read out the data and the type information (herein, referred to as the data 71 and the type information 711), and send to the internal bus 4.

The data 71 and the type information 711 sent to the internal bus 4 are given to the calculation execution unit 6.

Subsequently, the instruction controller 3 conducts instruction of read-out for the corresponding data register among the data registers 51~5n on the basis of the field of the register 2 in the inputted instruction word.

The data register which is instructed read-out, and the type information register corresponding thereto simultaneously read out the data and the type information (herein, referred to as the data 72

The type information comparator 22 and 62 compares the type information as an execution result of the instruction during execution of the instruction with the type information retained in the type information register corresponding to the data register which is required by the instruction.

When the type information as the execution result of the instruction is in disagreement with the type information retained in the type information register, the type information comparators 22 and 62 generate the exception interrupt, and notify to the instruction controller 3 via the interrupt bus 42.

The instruction word designates the type information of the execution result (the date type and the effective bit width) independently of the type information (the data type and the effective bit width) of the data used for the calculation.

Figure 2:
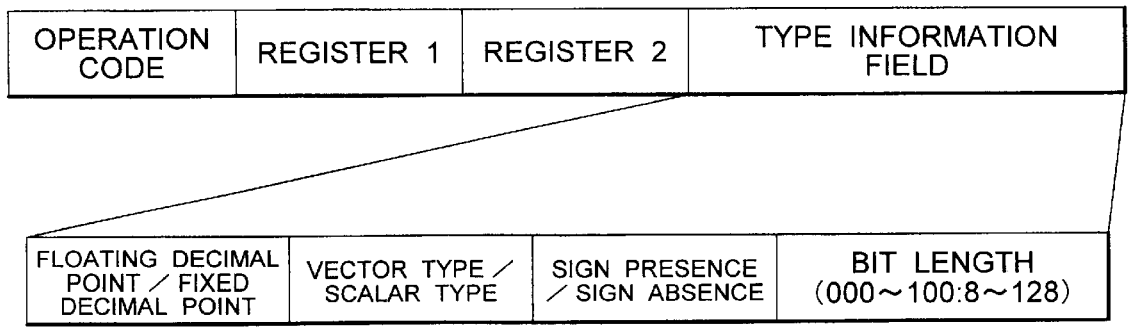
FIG. 2 is a diagram exemplifying content of an instruction word used in a microprocessor according to the first embodiment.

FIG. 2 illustrates an example which designates the type information (the data type and the effective bit width) of the execution result in an internal portion of the instruction word in the microprocessor according to the first embodiment.

In the internal portion of the instruction word, a type information field indicating the type information (the data type and the effective bit length) of the execution result is attached other than an operation code and each field of a register 1 and a register 2.

The type information field can designate distinction of the floating decimal point/the fixed decimal point, distinction of the vector type/scalar type, distinction of sign presence/sign absence, and a bit length (the effective bit width). Further, the data type (the data type and the effective bit width) of the execution result is designated by a value of each bit. and the type information 721), and send to the internal bus 4.

The data 71 and the type information 711 sent to the internal bus 4 are given to the calculation execution unit 6.

Further, the instruction controller 3 sends the operation code in the instruction word into the calculation execution unit 6 via the instruction execution bus 41.

Subsequently, the instruction controller 3 sends the type information (the type information of the execution result) of the type information field in the instruction word into the calculation execution unit 6 via the instruction execution bus 41.

In the calculation execution unit 6, the type information comparator 62 initially compares the type information 711 with the type information 721. As s result of the comparison, when the type information 711 and the type information 721 are in disagreement, the exceptional interrupt takes place ,and notifies to the instruction controller 3 via the interrupt bus 42.

The type information comparator 62 generates the exceptional interrupt ,and notifies to the instruction controller 3 via the interrupt bus 42 because the effective bit width of the data 71 is different from the effective bit width of the date 72 in an example of FIG. 3.

When the instruction controller 3 receives the exceptional interrupt via the interrupt bus 42, it starts the specialized exceptional process due to the software.

Further, the type information comparator 62 does not generate the exceptional interrupt, and only comparison between the type information 711 and the type information 721 may be performed.

When the comparison result between the type information 711 and the type information 721 due to the type information comparator 62 is in agreement, the calculation execution unit 6 executes the calculation instruction in accordance with the operand code in which the data and the date 72 are defined as the operand. Further, the execution result of the data type represented by the type information of the calculation result and the effective data width, and the type information thereof are stored in the corresponding data register and the type information register via the internal bus 4.

On the other hand, if the instruction controller 3 represents that the operation code of the inputted instruction word is the input output instruction, it performs the read-out instruction for the corresponding data register among the data registers 51~5n.

Further, the instruction controller 3 sends the operation code in the instruction word into the input output execution unit 2 via the instruction execution bus 4.

Subsequently, the instruction controller 3 send the type information of the type information field in the instruction word into the input output execution unit 2 via the instruction execution bus 41.

In the input output execution unit 2, the type information comparator 22 compares the type information of the type information register given via the internal bus 4 with the type information in the instruction word given via the instruction execution bus 41. As a result the comparison, if both type information are in agreement, the input output instruction is executed in accordance with the operation code.

When both information are different, the type information comparator 22 generates the exceptional interrupt, and notifies to the instruction controller 3 via the interrupt bus 42.

When the instruction controller 3 receives the exceptional interrupt, it starts the specialized exceptional process due to the software.

Second Embodiment

Figure 4:
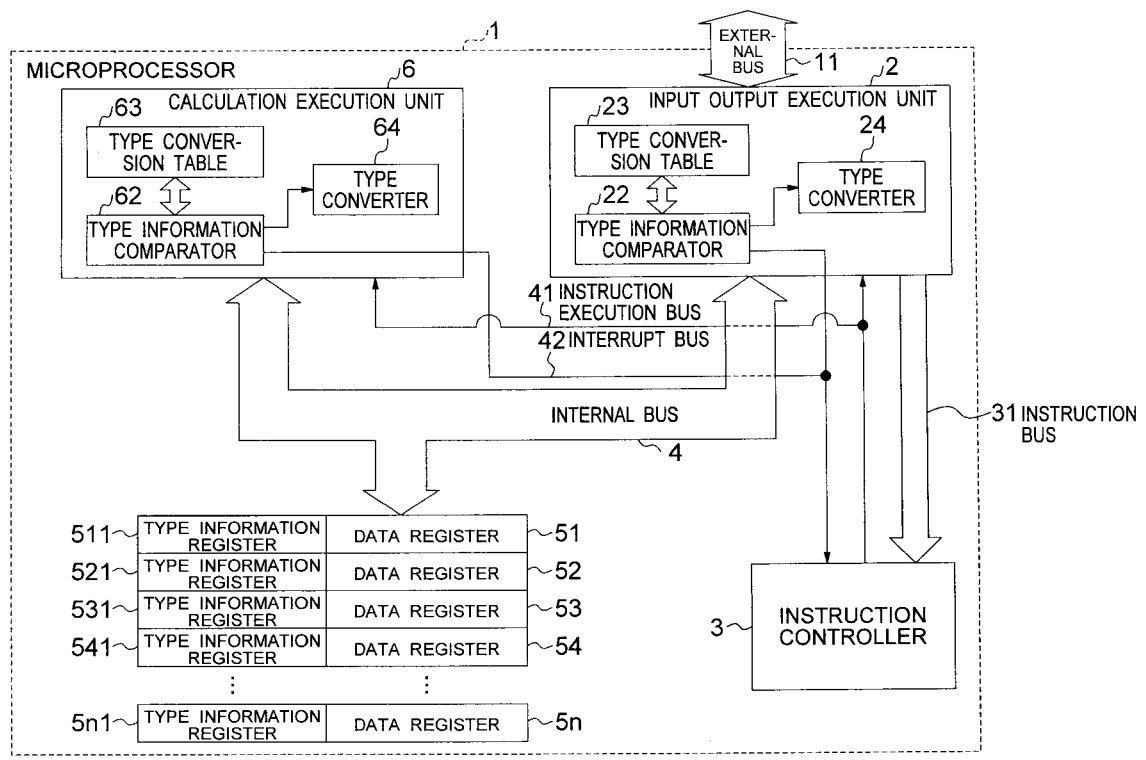
FIG. 4 is a circuit block diagram showing a structure of a microprocessor according to a second embodiment of this invention.

Referring to FIG. 4, description will be made about a second embodiment of this invention.

The microprocessor 1 according to this embodiment is different in comparison with the microprocessor 1 according to the first embodiment illustrated in FIG. 1 in that a type conversion table 23 and a type converter 24 are mounted in an input output execution unit 2, and a type conversion table 63 and a type converter 64 are mounted in a calculation execution unit 6. Accordingly, the same reference numbers are attached to the corresponding circuit elements, and detail description will be omitted because the other circuit elements are structured and arranged in the same manner with the case of the microprocessor 1 of the first embodiment.

Figure 5:
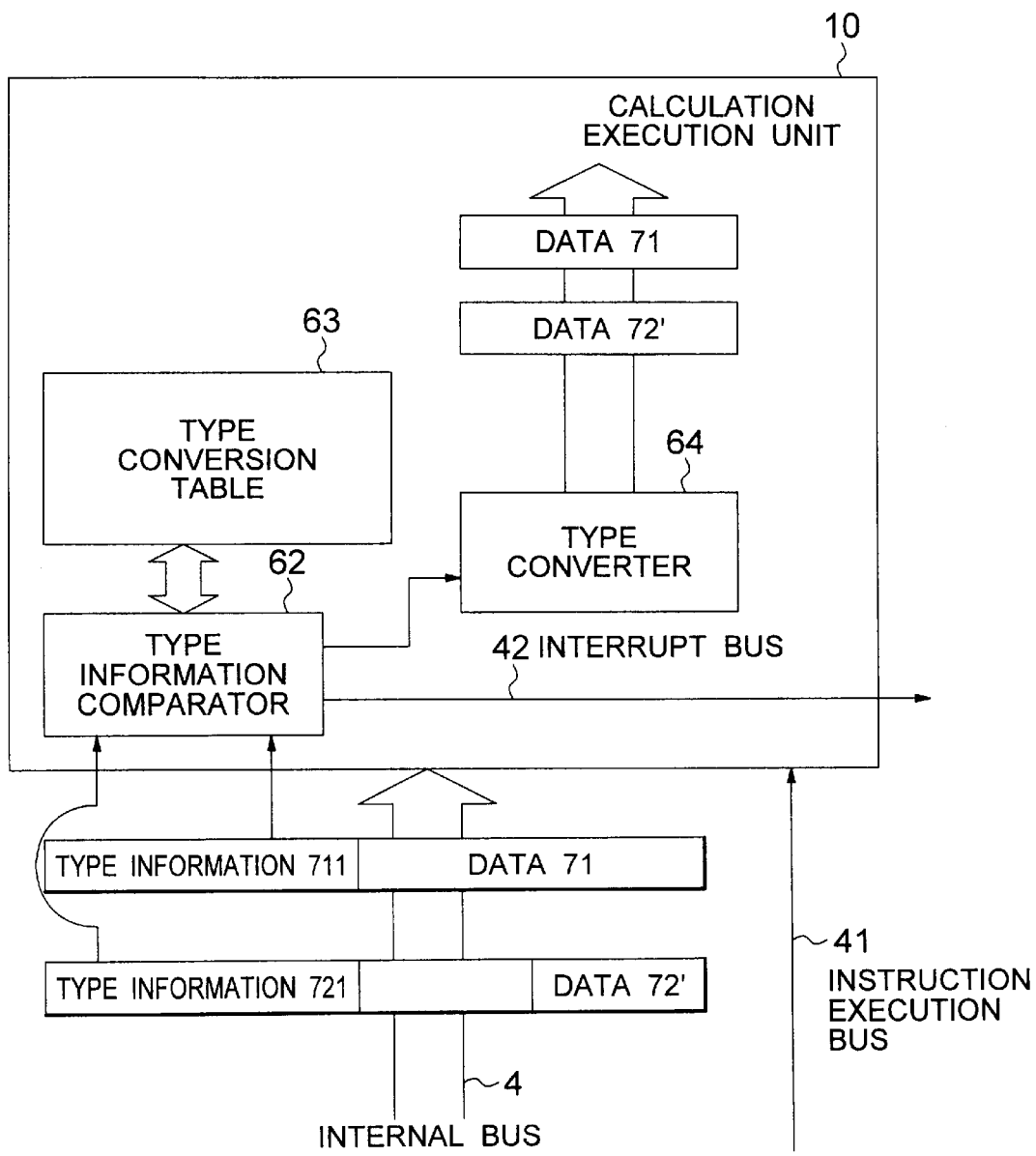
FIG. 5 is a diagram explaining an example for performing a type conversion when type information disagrees in a microprocessor according to the second embodiment.

FIG. 5 is a diagram exemplifying a process in which a type information comparator 62 controls a type converter 64 by the use of a type conversion table 63 in the microprocessor 1 according to the second embodiment.

In this example, the data 72 has an effective bit width of half of a data 71, and this fact is reflected for a type information 711 and 721.

FIG. 6 is a diagram for exemplifying content of the type conversion tables 23 and 63. In the type conversion tables 23 and 63, abscissa axis corresponds to the type information of the data (the data type and the effective bit width), vertical axis corresponds to the type information of the execution result (the data type and the effective bit width), respectively, and designation is made about whether or not the type conversion is possible for each matrix element or whether or not the exceptional interrupt generates (the type conversion is impossible).

Subsequently, description will be made about an operation of the microprocessor 1 according to thus-structured second embodiment by concentrating upon difference points with respect to the operation of the microprocessor 1 according to the first embodiment with reference to FIG. 4 through FIG. 6.

The data 71 and the type information 711 of the data register sent into the internal bus 4 ,and the type information 711 and the data 72 and the type information 721 are sequentially given to the calculation execution unit 6 in the same manner as the case of the microprocessor 1 according to the first embodiment.

Further, the instruction controller 3 sends the type information of the type information field in the instruction word (the type information of the execution result) into the calculation execution unit 6 via the instruction execution bus 41.

In the calculation execution unit 6, the type information comparator 62 compares the type information 711 with the type information 721.

Further, the type information comparator 62 judges whether or not combination between the type information 711 and the type information 721, and combination between the type information 711 and 721 and the type information of the execution result is combination for executing the type conversion.

When it is not the combination for executing the type conversion, the type information comparator 62 sends the exceptional interrupt into the instruction controller 3 via the interrupt bus 42 in the same manner as the case of the microprocessor according to the first embodiment.

When it is the combination for executing the type conversion, the type conversion 64 converts the data 71 and 72 or the calculation result into the designated type. In an example of FIG. 5, the bit is extended such that the data 72 has the same effective bit width as the data 71 ,and is converted into a data 72' in the type.

Also, the exceptional interrupt does not generate in the type information comparators 22 and 62, and only comparison of the type information and the type conversion of the data may be performed.

Third Embodiment

Figure 7:
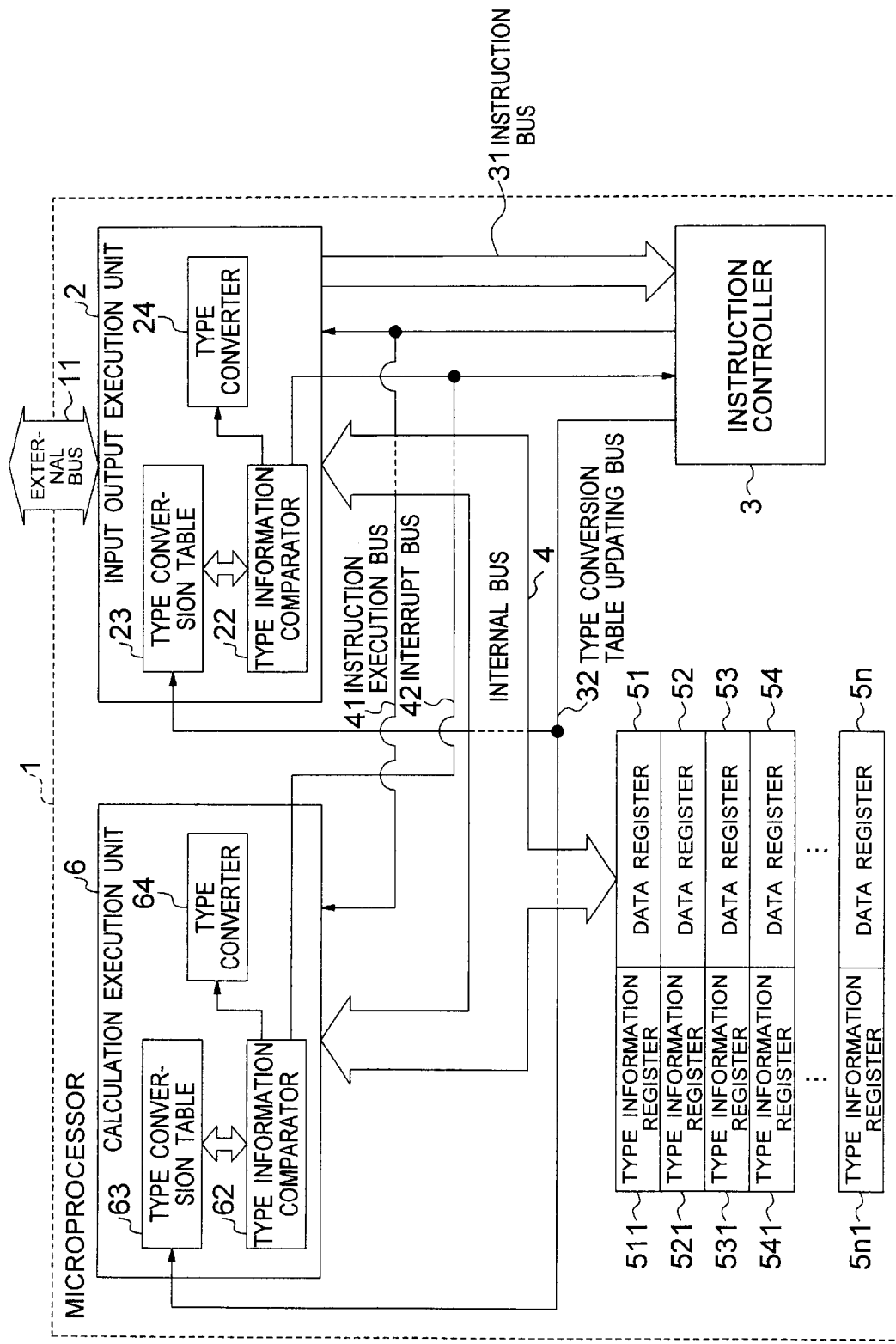
FIG. 7 is a circuit block diagram showing a structure of a microprocessor according to a third embodiment of this invention.

Referring to FIG. 7, description will be made about a third embodiment of this invention.

In the microprocessor 1 according to this embodiment, a type conversion table update bus 32, which connects between the instruction controller 3 and the type conversion tables 23 and 63, is mounted for the microprocessor 1 according to the second embodiment illustrated in FIG. 4.

Accordingly, the same reference numbers are attached to the corresponding circuit elements, and detail description will be omitted because the other circuit elements are structured and arranged in the same manner with the case of the microprocessor 1 according to the second embodiment.

FIG. 8 is a diagram exemplifying a way in which the matrix elements of the type conversion tables 23 and 63 are updated by a specific instruction of the microprocessor 1 in the microprocessor 1 according to the third embodiment.

FIG. 9 is a diagram showing an example in which a plurality of matrix elements of the type conversion tables 23 and 63 are simultaneously converted by the specific instruction of the microprocessor 1 in the microprocessor 1 according to the third embodiment.

Subsequently, description will be made about an operation of the microprocessor 1 according to thus-structured third embodiment by concentrating upon different points with respect to the operation of the microprocessor 1 according to the first and second embodiments with reference to FIG. 7 through FIG. 9.

When the instruction controller 3 is given with the specific instruction for updating the type conversion tables 23 and 63 via the instruction bus 31, it updates the type conversion tables 23 and 63 by the use of the type conversion table updating bus 32.

Whether or not a plurality of matrix elements of the type conversion tables 23 and 63 are updated by a single instruction or whether or not only the specific matrix element is updated is different in dependency upon a mounting method of the instruction of the microprocessor 1.

For example, referring to FIG. 8, although there is the exceptional interrupt process before updating with respect to the matrix element having the effective data width of the data of 16 bit and the effective date width of the execution result of 8 bit (referring to FIG. 6), it is changed such that the conversion is possible after updating.

Also, referring to FIG. 9, all of the matrix elements having the effective bit width of the execution result of 64 bit are changed from execution of the type conversion to generation of the exceptional interrupt.

Fourth Embodiment

Figure 10:
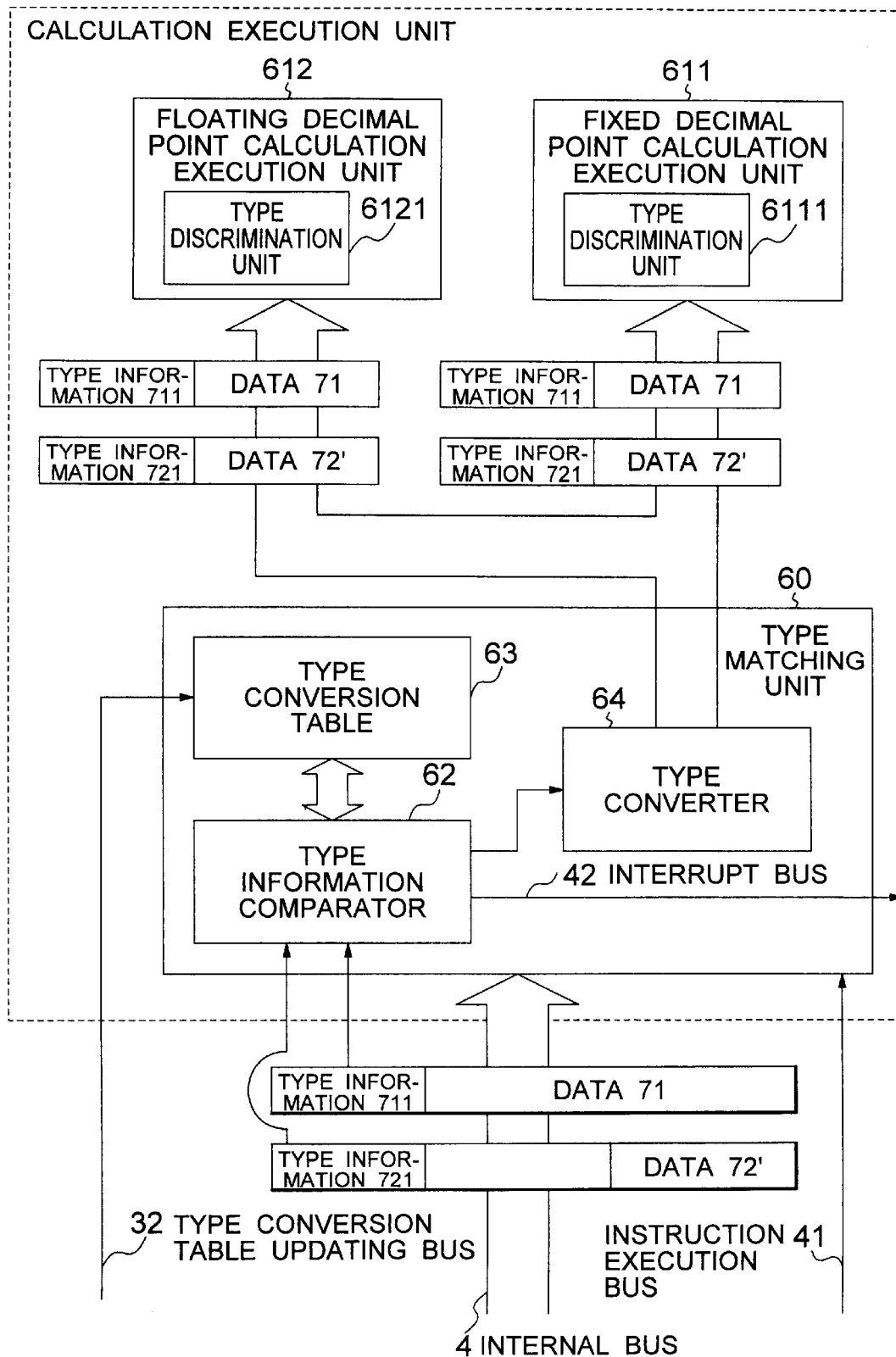
FIG. 10 is a circuit block diagram showing a main portion of a microprocessor according to a fourth embodiment of this invention.

Referring to FIG. 10, description will be made about a fourth embodiment according to this invention.

When there is a difference with respect to a date type other than an effective bit width of the data, a microprocessor 1 according to this embodiment selects a fixed decimal point calculation execution unit 611 or a floating decimal point calculation execution unit 612 in accordance with the data type.

In this microprocessor 1, an calculation execution unit 6 is composed of a type information comparator 62, a type matching unit 60 containing a type conversion table 63 and a type converter 64, a fixed decimal point calculation execution unit 611 containing a type discrimination unit 6111, and a floating decimal point calculation execution unit 612 containing a type discrimination unit 6121.

Further, the same reference numbers are attached to the corresponding circuit elements, and detail description will be omitted because the other circuit elements are structured and arranged in the same manner with the case of the microprocessor 1 according to the third embodiment.

Subsequently, description will be made about an operation of the microprocessor 1 according to thus-structured fourth embodiment by concentrating upon difference points with respect to the operation of the microprocessor 1 according to the first through third embodiments with reference to FIG. 10.

Now, both the data 71 and 72 are the fixed decimal point data, and the data 72 has the effective bit width of half of the data 71. This fact is reflected by the type information 71 and 72.

When the data 71 and the type information 711, and the data 72 and the type information 721 are given to the type matching unit 60 via the internal bus 4, the type information comparator 62 identifies that both the data 71 and 72 are the fixed decimal point data, and judges that it is combination for executing the type conversion with reference to the type information table 63. To this end, the type converter 64 converts the data 72 into the data 72' in the type, and outputs them.

Although the outputted data 71 and the type information 711, and the data 72' and the type information 721 are sent the data 71 and 72 to the fixed decimal point calculation execution unit 611 via the type matching unit 60, they are also sent to the floating decimal point calculation execution unit 621 at the same time.

In the fixed decimal point calculation execution unit 611, the type discrimination unit 6111 judges whether or not the data 71 and 72' are data sent for the calculation execution unit referring to the type information 711 and 721.

The fixed decimal point calculation execution unit 611 executes the fixed decimal point calculation by the use of the data 71 and 72' because the date type indicated by the type information 711 and 721 is the fixed decimal point.

On the other hand, the type discrimination unit 6121 judges whether or not the data 71 and 72' are data sent for the calculation execution unit referring to the type information 711 and 721 in the floating decimal calculation execution unit 612.

The type discrimination unit 6121 identifies that the data type is in disagreement because the data type represented by the type information 711 and 721 is the floating decimal point. To this end, the floating decimal calculation execution unit 612 ignores the data 71 and 71'.

Also, when the data 71 and 72' are the floating decimal point data, the fixed decimal calculation execution unit 611 ignores the data 71 and 72', and the floating decimal point calculation execution unit 612 executes the floating decimal point calculation by the use of the data 71 and 72'.

Fifth Embodiment

Figure 11:
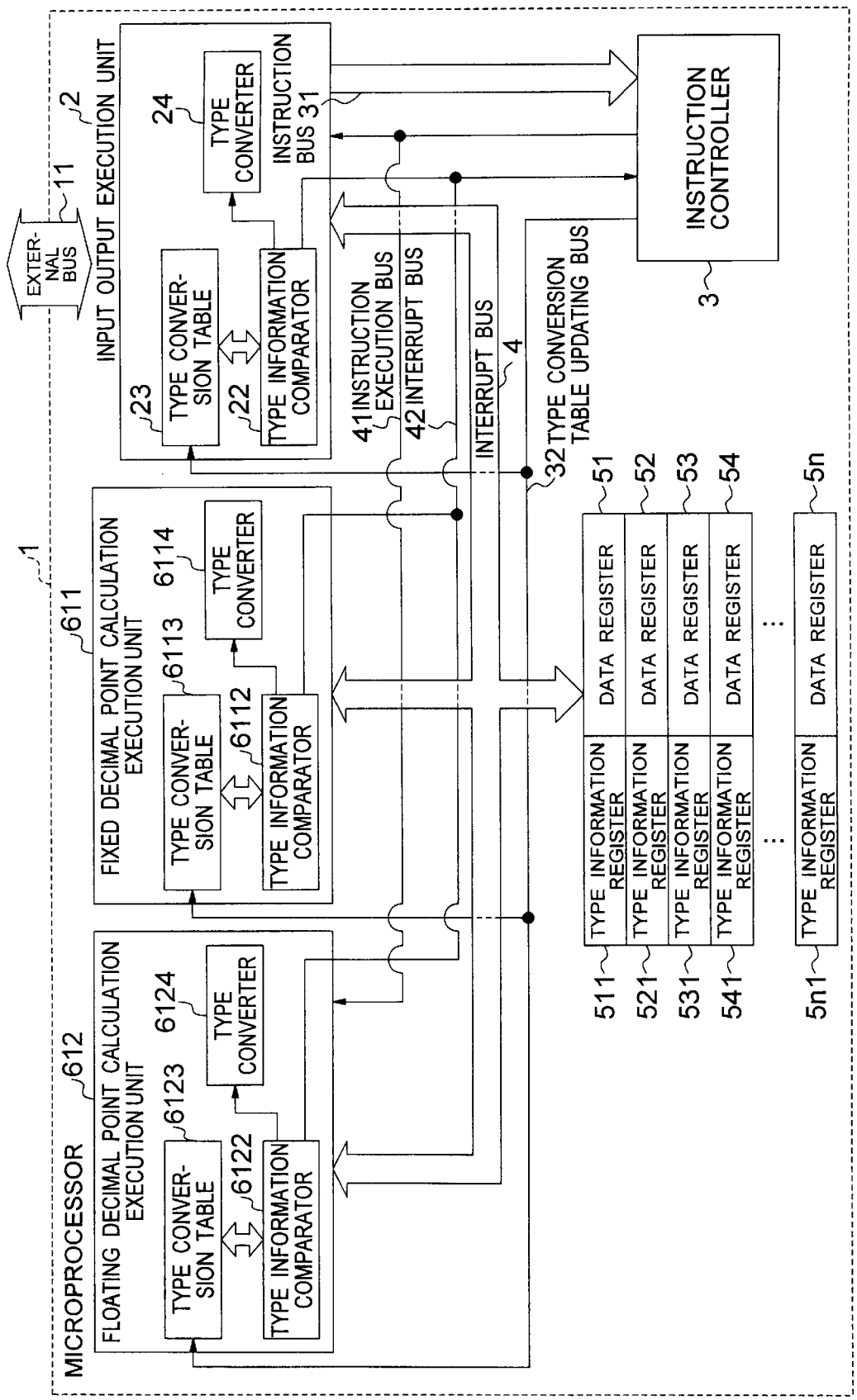
FIG. 11 is a circuit block diagram showing a structure of a microprocessor according to a fifth embodiment of this invention.

Referring to FIG. 11, description will be made about a fifth embodiment according to this invention.

When there is a difference with respect to the date type other than the effective bit width of the data, the microprocessor 1 according to this embodiment selects the fixed decimal point calculation execution unit 611 or the floating decimal point calculation execution unit 612 in accordance with the data type.

In this microprocessor 1, the main portion thereof is composed of the input output execution unit 2, the instruction controller 3, the internal bus 4, the external bus 11, the instruction bus 31, the type conversion table updating bus 32, the instruction execution bus 41, the interrupt bus 42, the data registers 51~5n, the type information registers 511~5n1, the fixed decimal point calculation execution unit 611, and the floating decimal point calculation execution unit 612.

The fixed decimal point calculation execution unit 611 contains the type information comparator 6112, the type conversion table 6113, and the type converter 6114.

The floating decimal point calculation execution unit 612 contains the type information comparator 6122, the type conversion table 6123, and the type converter 6124.

Further, the same reference numbers are attached to the corresponding circuit elements, and detail description will be omitted because the calculation execution unit 6 in the microprocessor 1 according to the third embodiment illustrated in FIG. 7 is divided into the fixed decimal point calculation execution unit 611 and the floating decimal point calculation execution unit 612 in the microprocessor 1 according to the fifth embodiment.

Subsequently, description will be made about an operation of the microprocessor 1 according to thus-structured fifth embodiment by concentrating upon difference points with respect to the operation of the microprocessor 1 according to the first through fourth embodiments with reference to FIG. 11.

The instruction controller 3 decodes the inputted instruction word, and if the operation code represents the fixed decimal point calculation instruction, it sends the operation code in the instruction word into the fixed decimal point calculation execution unit 611 via the instruction execution bus 41. Further, if the operation code indicates the floating decimal point calculation instruction, it sends the operation code in the instruction word into the floating decimal point calculation execution unit 612 via the instruction execution bus 41.

In the fixed decimal point calculation execution unit 611, the type information comparator 6112 compares the type information referring to the type conversion table 6113. As a result of the comparison, if combination of the type information is combination for executing the type conversion, the type converter 6114 executes the fixed decimal point calculation after performing the type conversion of the data.

Further, if the combination of the type information is not the combination for executing the type conversion, the type information comparator 6112 generates the exceptional interrupt, and sends it into the instruction controller 3 via the interrupt bus 42.

Similarly, in the floating decimal point calculation execution unit 612, the type information comparator 6122 compares the type information referring to the type conversion table 6123. As a result of the comparison, if combination of the type information is combination for executing the type conversion, the type converter 6124 executes the floating decimal point calculation after performing the type conversion of the data.

Further, if the combination of the type information is not the combination for executing the type conversion, the type information comparator 6122 generates the exceptional interrupt ,and sends it into the instruction controller 3 via the interrupt bus 42.

According to this invention, when variation occurs for the effective bit width of the register by the bit width extension due to the generation change of the microprocessor, it is possible to assure the operation of the program. This is because the type conversion of the data is automatically performed if the combination between the type information of the data used for the instruction or between the type information of the data and the type information of the execution result of the instruction is the combination for executing the type conversion.

Further, according to this invention, it is possible to previously prevent the generation of the bug due to the error of the data type which becomes the problem at the initial stage of the program development. This is because the exceptional interrupt generates, and the exceptional process is executed if the combination between the type information of the data used for the instruction or between the type information of the data and the type information of the execution result of the instruction is not the combination for executing the type conversion.

What is claimed is:

1. A microprocessor, comprising:
a plurality of data registers;
a plurality of type information registers which correspond to each of said data registers and which retain type information of the data retained in said data register; and
a type information comparator which compares type information of an execution result of an instruction with type information of the type information register corresponding to the data register which is requested by said instruction when the instruction, which is designated the type information of the execution result, is executed and which generates an exceptional interrupt when the type information of the execution result of said instruction and the type information of said type information register are in disagreement.

2. A microprocessor as claimed in claim 1, wherein:
said type information is composed of a data type and an effective bit width.

3. A large scale integrated circuit, wherein:
the microprocessor claimed in claim 1 is incorporated as a core.

4. A microprocessor, comprising:
a plurality of data registers;
a plurality of type information registers which correspond to each of said data registers and which retain type information of the data retained in said data register;
a type information comparator which compares type information of an execution result of an instruction with type information of the type information register corresponding to the data register which is requested by said instruction when the instruction, which is designated the type information of the execution result, is executed; and
a type converter which converts data in type on the basis of setting inherent to the microprocessor when it is detected by the type information comparator that the type information of the execution result of said instruction and the type information of said type information register are in disagreement.

5. A microprocessor as claimed in claim 4, wherein:
said type information is composed of a data type and an effective bit width.

6. A large scale integrated circuit, wherein:
the microprocessor claimed in claim 4 is incorporated as a core.

7. A microprocessor, comprising:
a plurality of data registers;
a plurality of type information registers which correspond to each of said data registers and which retain type information of the data retained in said data register;
a type information comparator which compares type information of an execution result of an instruction with type information of the type information register corresponding to the data register which is requested by said instruction when the instruction, which is designated the type information of the execution result, is executed and which generates an exceptional interrupt when combination of these type information is not combination for executing type conversion; and
a type converter which executes the type conversion of the data on the basis of setting inherent to the microprocessor when it is detected by the type information comparator that the combination of said type information is the combination for executing the type conversion.

8. A microprocessor as claimed in claim 7, wherein:
said type information is composed of a data type and an effective bit width.

9. A large scale integrated circuit, wherein:
the microprocessor claimed in claim 7 is incorporated as a core.

10. A microprocessor, comprising:

a plurality of data registers;

a plurality of type information registers which correspond to each of said data registers and which retain type information of the data retained in said data register;

an internal bus which is capable of simultaneously transmitting the data of said data register and the type information of said type information register; and a type information comparator which simultaneously receives the data of said data register and the type information of said type information register corresponding to said data register via said internal bus and which compares the type information of a plurality of type information registers ,and which generates an exceptional interrupt when combination of these type information is not combination for executing type conversion.

11. A microprocessor as claimed in claim 10, wherein:

said type information is composed of a data type and an effective bit width.

12. A large scale integrated circuit, wherein:

the microprocessor claimed in claim 10 is incorporated as a core.

13. A microprocessor, comprising:

a plurality of data registers;

a plurality of type information registers which correspond to each of said data registers and which retain type information of the data retained in said data register;

an internal bus which is capable of simultaneously transmitting the data of said data register and the type information of said type information register;

a type information comparator which simultaneously receives the data of said data register and the type information of said type information register corresponding to said data register via said internal bus and which compares the type information of a plurality of type information registers; and a type converter which executes type conversion of the data on the basis of setting inherent to the microprocessor when it is detected by the type information comparator that the combination of said type information is the combination for executing the type conversion.

14. A microprocessor as claimed in claim 13, wherein:

said type information is composed of a data type and an effective bit width.

15. A large scale integrated circuit, wherein:

the microprocessor claimed in claim 13 is incorporated as a core.

16. A microprocessor, comprising:

a plurality of data registers;

a plurality of type information registers which correspond to each of said data registers and which retain type information of the data retained in said data register;

an internal bus which is capable of simultaneously transmitting the data of said data register and the type information of said type information register;

a type information comparator which simultaneously receives the data of said data register and the type information of said type information register corresponding to said data register via said internal bus and which compares the type information of a plurality of type information registers, and which generates an exceptional interrupt when combination of these type information is not combination for executing type conversion; and a type converter which executes the type conversion of the data on the basis of setting inherent to the microprocessor when it is detected by the type information comparator that the combination of said type information is the combination for executing the type conversion.

17. A microprocessor as claimed in claim 16, wherein:

said type information is composed of a data type and an effective bit width.

18. A large scale integrated circuit, wherein:

the microprocessor claimed in claim 16 is incorporated as a core.

19. A microprocessor, comprising:

a plurality of data registers;

a plurality of type information registers which correspond to each of said data registers and which retain type information of the data retained in said data register;

an internal bus which is capable of simultaneously transmitting the data of said data register and the type information of said type information register;

a type information comparator which compares type information of an execution result of an instruction with type information of the type information register corresponding to the data register which is requested by said instruction when the instruction, which is designated the type information of the execution result, is executed and which generates an exceptional interrupt when the type information of the execution result of said instruction and the type information of said type information register are in disagreement;

an input output execution unit which includes said type information comparator and which simultaneously receives the data of said data register and the type information of said type information register corresponding to said data register via said internal bus and which performs an input and output for an external via an external bus;

a calculation execution unit which includes said type information comparator and which simultaneously receives the data of said data register and the type information of said type information register corresponding to said data register via said internal bus and which executes calculation; and an instruction controller which decodes an instruction word given from said input output execution unit via an instruction bus and which sends the instruction to said input and output execution unit and said calculation execution unit via an instruction execution bus and which inputs an exceptional interrupt from said type information comparator via an interrupt bus and which starts a specialized exceptional process.

20. A microprocessor as claimed in claim 19, wherein:

said type information is composed of a data type and an effective bit width.

21. A large scale integrated circuit, wherein:

the microprocessor claimed in claim 19 is incorporated as a core.

22. A microprocessor, comprising:

a plurality of data registers;

a plurality of type information registers which correspond to each of said data registers and which retain type information of the data retained in said data register;

an internal bus which is capable of simultaneously transmitting the data of said data register and the type information of said type information register;

a type conversion table which has the type information of an execution result and the type information of the data as row and column and which has right and wrong with respect to execution of the type conversion as a matrix element;

a type information comparator which judges whether or not combination of type information of an execution result of an instruction and type information of the type information register corresponding to the data register which is requested by said instruction when the instruction, which is designated the type information of the execution result, is executed is combination for executing type conversion with reference to said type conversion table and which generates an exceptional interrupt when the combination of these type information is not the combination for executing the type conversion;

a type converter which executes the type conversion of the data when it is detected by said type information comparator that the combination of the type information is the combination for executing the type conversion;

an input output execution unit which includes said type conversion table, said type information comparator and said type converter and which simultaneously receives the data of said data register and the type information of said type information register corresponding to said data register via said internal bus and which performs an input and output for an external via an external bus;

a calculation execution unit which includes said type conversion table, said type information comparator and said type converter and which simultaneously receives the data of said data register and the type information of said type information register corresponding to said data register via said internal bus and which executes calculation; and an instruction controller which decodes an instruction word given from said input output execution unit via an instruction bus and which sends the instruction to said input and output execution unit and said calculation execution unit via an instruction execution bus and which inputs an exceptional interrupt from said type information comparator via an interrupt bus and which starts a specialized exceptional process.

23. A microprocessor as claimed in claim 22, wherein:

said type information is composed of a data type and an effective bit width.

24. A large scale integrated circuit, wherein:

the microprocessor claimed in claim 22 is incorporated as a core.

25. A microprocessor, comprising:

a plurality of data registers;

a plurality of type information registers which correspond to each of said data registers and which retain type information of the data retained in said data register;

an internal bus which is capable of simultaneously transmitting the data of said data register and the type information of said type information register;

a type conversion table which has the type information of an execution result and the type information of the data as row and column and which has right and wrong with respect to execution of the type conversion as a matrix element;

a type information comparator which judges whether or not combination of type information of an execution result of an instruction and type information of the type information register corresponding to the data register which is requested by said instruction when the instruction which is designated the type information of the execution result, is executed is combination for executing type conversion with reference to said type conversion table and which generates an exceptional interrupt when the combination of these type information is not the combination for executing the type conversion;

a type converter which executes the type conversion of the data when it is detected by said type information comparator that the combination of the type information is the combination for executing the type conversion;

an input output execution unit which includes said type conversion table, said type information comparator and said type converter and which simultaneously receives the data of said data register and the type information of said type information register corresponding to said data register via said internal bus and which performs an input and output for an external via an external bus;

a calculation execution unit which includes said type conversion table, a type matching unit containing said type information comparator and said type converter, a fixed decimal point calculation execution unit containing a type discrimination unit, and a floating decimal point calculation execution unit containing the type discrimination unit and which simultaneously receives the data of said data register and the type information of said type information register corresponding to said data register via said internal bus and which executes calculation; and an instruction controller which decodes an instruction word given from said input output execution unit via an instruction bus and which sends the instruction to said input and output execution unit and said calculation execution unit via an instruction execution bus and which inputs an exceptional interrupt from said type information comparator via an interrupt bus and which starts a specialized exceptional process.

26. A microprocessor as claimed in claim 25, wherein:

said type information is composed of a data type and an effective bit width.

27. A large scale integrated circuit, wherein:

the microprocessor claimed in claim 25 is incorporated as a core.

28. A microprocessor, comprising:

a plurality of data registers;

a plurality of type information registers which correspond to each of said data registers and which retain type information of the data retained in said data register;

an internal bus which is capable of simultaneously transmitting the data of said data register and the type information of said type information register;

a type conversion table which has the type information of an execution result and the type information of the data as row and column and which has right and wrong with respect to execution of the type conversion as a matrix element;

a type information comparator which judges whether or not combination of type information of an execution result of an instruction and type information of the type information register corresponding to the data register which is requested by said instruction when the instruction which is designated the type information of the execution result is executed, is combination for executing type conversion with reference to said type conversion table and which generates an exceptional interrupt when the combination of these type information is not the combination for executing the type conversion;

a type converter which executes the type conversion of the data when it is detected by said type information comparator that the combination of the type information is the combination for executing the type conversion;

an input output execution unit which includes said type conversion table, said type information comparator and said type converter and which simultaneously receives the data of said data register and the type information of said type information register corresponding to said data register via said internal bus and which performs an input and output for an external via an external bus;

a fixed decimal point calculation execution unit which includes said type conversion table, said type information comparator and said type converter and which simultaneously receives the data of said data register and the type information of said type information register corresponding to said data register via said internal bus and which executes a fixed decimal point calculation;

a floating decimal point calculation execution unit which includes said type information comparator, said type conversion table, and said type converter and which simultaneously receives the data of said data register and the type information of said type information register corresponding to said data register via said internal bus and which executes a floating decimal point calculation;

an instruction controller which decodes an instruction word given from said input output execution unit via an instruction bus and which sends the instruction to said input and output execution unit, said fixed decimal point calculation execution unit and said floating decimal point calculation execution unit via an instruction execution bus and which inputs an exceptional interrupt from said type information comparator via an interrupt bus and which starts a specialized exceptional process.

29. A microprocessor as claimed in claim 28, wherein:
said type information is composed of a data type and an effective bit width.

30. A large scale integrated circuit, wherein:
the microprocessor claimed in claim 29 is incorporated as a core.

31. A microprocessor, comprising:
a plurality of data registers;
a plurality of type information registers which correspond to each of said data registers and which retain type information of the data retained in said data register;
an internal bus which is capable of simultaneously transmitting the data of said data register and the type information of said type information register;
a type information comparator which compares type information of a plurality of type information registers and which generates an exceptional interrupt when these type information is in disagreement;
an input output execution unit which includes said type information comparator and which simultaneously receives the data of said data register and the type information of said type information register corresponding to said data register via said internal bus and which performs an input and output for an external via an external bus;

a calculation execution unit which includes said type information comparator and which simultaneously receives the data of said data register and the type information of said type information register corresponding to said data register via said internal bus and which executes calculation; and an instruction controller which decodes an instruction word given from said input output execution unit via an instruction bus and which sends the instruction to said input and output execution unit and said calculation execution unit via an instruction execution bus and which inputs an exceptional interrupt from said type information comparator via an interrupt bus and which starts a specialized exceptional process.

32. A microprocessor as claimed in claim 31, wherein:
said type information is composed of a data type and an effective bit width.

33. A large scale integrated circuit, wherein:
the microprocessor claimed in claim 31 is incorporated as a core.

34. A microprocessor, comprising:
a plurality of data registers;
a plurality of type information registers which correspond to each of said data registers and which retain type information of the data retained in said data register;
an internal bus which is capable of simultaneously transmitting the data of said data register and the type information of said type information register;
a type conversion table which has the type information of an execution result and the type information of the data as row and column and which has right and wrong with respect to execution of the type conversion as a matrix element;
a type information comparator which compares type information of a plurality of type information registers and which judges whether or not combination of these type information is combination for executing type conversion with reference to said type conversion table and which generates an exceptional interrupt when the combination of these type information is not the combination for executing the type conversion;
a type converter which executes the type conversion of the data when it is detected by said type information comparator that the combination of the type information is the combination for executing the type conversion;
an input output execution unit which includes said type conversion table, said type information comparator and said type converter and which simultaneously receives the data of said data register and the type information of said type information register corresponding to said data register via said internal bus and which performs an input and output for an external via an external bus;
a calculation execution unit which includes said type conversion table, said type information comparator and said type converter and which simultaneously receives the data of said data register and the type information of said type information register corresponding to said data register via said internal bus and which executes calculation; and
an instruction controller which decodes an instruction word given from said input output execution unit via an instruction bus and which sends the instruction to said input and output execution unit and said calculation execution unit via an instruction execution bus and which inputs an exceptional interrupt from said type information comparator via an interrupt bus and which starts a specialized exceptional process.

35. A microprocessor as claimed in claim 34, wherein:

said type information is composed of a data type and an effective bit width.

36. A large scale integrated circuit, wherein:

the microprocessor claimed in claim 34 is incorporated as a core.

37. A microprocessor, comprising:

a plurality of data registers;

a plurality of type information registers which correspond to each of said data registers and which retain type information of the data retained in said data register;

an internal bus which is capable of simultaneously transmitting the data of said data register and the type information of said type information register;

a type conversion table which has the type information of an execution result and the type information of the data as row and column and which has right and wrong with respect to execution of the type conversion as a matrix element;

a type information comparator which compares type information of a plurality of type information registers and which judges whether or not combination of these type information is combination for executing type conversion with reference to said type conversion table and which generates an exceptional interrupt when the combination of these type information is not the combination for executing the type conversion;

a type converter which executes the type conversion of the data when it is detected by said type information comparator that the combination of the type information is the combination for executing the type conversion;

an input output execution unit which includes said type conversion table, said type information comparator and said type converter and which simultaneously receives the data of said data register and the type information of said type information register corresponding to said data register via said internal bus and which performs an input and output for an external via an external bus;

a calculation execution unit which includes said type conversion table, a type matching unit containing said type information comparator and said type converter, a fixed decimal point calculation execution unit containing a type discrimination unit, and a floating decimal point calculation execution unit containing the type discrimination unit and which simultaneously receives the data of said data register and the type information of said type information register corresponding to said data register via said internal bus and which executes calculation; and an instruction controller which decodes an instruction word given from said input output execution unit via an instruction bus and which sends the instruction to said input and output execution unit and said calculation execution unit via an instruction execution bus and which inputs an exceptional interrupt from said type information comparator via an interrupt bus and which starts a specialized exceptional process.

38. A microprocessor as claimed in claim 37, wherein:

said type information is composed of a data type and an effective bit width.

39. A large scale integrated circuit, wherein:

the microprocessor claimed in claim 37 is incorporated as a core.

40. A microprocessor, comprising:

a plurality of data registers;

a plurality of type information registers which correspond to each of said data registers and which retain type information of the data retained in said data register;

an internal bus which is capable of simultaneously transmitting the data of said data register and the type information of said type information register;

a type conversion table which has the type information of an execution result and the type information of the data as row and column and which has right and wrong with respect to execution of the type conversion as a matrix element;

a type information comparator which compares type information of a plurality of type information registers and which judges whether or not combination of these type information is combination for executing type conversion with reference to said type conversion table and which generates an exceptional interrupt when the combination of these type information is not the combination for executing the type conversion;

a type converter which executes the type conversion of the data when it is detected by said type information comparator that the combination of the type information is the combination for executing the type conversion;

an input output execution unit which includes said type conversion table, said type information comparator and said type converter and which simultaneously receives the data of said data register and the type information of said type information register corresponding to said data register via said internal bus and which performs an input and output for an external via an external bus;

a fixed decimal point calculation execution unit which includes said type conversion table, said type information comparator and said type converter and which simultaneously receives the data of said data register and the type information of said type information register corresponding to said data register via said internal bus and which executes a fixed decimal point calculation;

a floating decimal point calculation execution unit which includes said type information comparator, said type conversion table, and said type converter and which simultaneously receives the data of said data register and the type information of said type information register corresponding to said data register via said internal bus and which executes a floating decimal point calculation;

an instruction controller which decodes an instruction word given from said input output execution unit via an instruction bus and which sends the instruction to said input and output execution unit, said fixed decimal point calculation execution unit and said floating decimal point calculation execution unit via an instruction execution bus and which inputs an exceptional interrupt from said type information comparator via an interrupt bus and which starts a specialized exceptional process.

41. A microprocessor as claimed in claim 40, wherein:

said type information is composed of a data type and an effective bit width.

42. A large scale integrated circuit, wherein:

the microprocessor claimed in claim 40 is incorporated as a core.

* * * * *